United States Patent Office

Re. 28,188
Reissued Oct. 8, 1974

28,188
METHOD OF FABRICATING A METALLIC CLAD PRODUCT

David A. Higbee and Joseph C. Jasper, Middletown, Ohio, assignors to Armco Steel Corporation, Middletown, Ohio No Drawing. Original No. 3,621,561, dated Nov. 23, 1971, Ser. No. 796,616, Feb. 4, 1969. Application for reissue Sept. 28, 1972, Ser. No. 265,712
Int. Cl. B22d *19/00;* B23p *17/00*
U.S. Cl. 29—527.7 16 Claims

Matter enclosed in heavy brackets [ ] appears in the original patent but forms no part of this reissue specification; matter printed in italics indicates the additions made by reissue.

ABSTRACT OF THE DISCLOSURE

[This disclosure relates to the product and to the] *The* method whereby a metallic composite is produced having a thin stainless steel core sandwiched between two relatively thick carbon or alloy steel outer layers. The composite is formed at the ingot stage by casting carbon steel or low alloy steel simultaneously about a stainless steel plate suspended in a mold, which plate has had its major surfaces covered by a protective layer so as to control the alloy depletion therefrom. The resulting product exhibits excellent resistance to pitting and penetration in those corrosive environments where such phenomena are known to be a problem.

BACKGROUND OF THE INVENTION

There is hardly an industrial concern today that is not involved in the problems caused by corrosion. The annual cost of corrosion is estimated to run as high as $7,000,000,000.00.

Corrosion, which is the chemical breakdown of basic materials such as metal, is the result of environmental conditions. Where it is impossible to affect changes in the environment, the solutions to overcome the problems of corrosion necessarily shift to a consideration of the materials. And, while one obvious answer would be to select materials unaffected by the service to which the material is to be used, practical considerations often prohibit such a move. Therefore, the general approach by industrial concerns has been in the direction of selecting materials which offer the best resistance to corrosion at the lowest ultimate cost.

To select the best materials requires a study of the service conditions; this includes, among other items, the temperature changes, moisture content, stresses encountered, the nature of the corrosive action, etc.

The present invention was prompted by the need to find a material that would resist those corrosive conditions which promote localized attack commonly referred to as pitting. For example, one problem area was in the field of culverts and underground storage containers, which encounter such conditions as salt water marsh, fresh water marsh, mine water, alkali and acid soil and water, farm field drainage, and domestic sanitary sewage. For the material to perform adequately under such severe conditions, it had to maintain a high level of strength, as well as resist pitting and therefore penetration from without. A corollary problem exists in automotive mufflers where condensate will collect and cause perforations and early failure. There are various other applications where general attack is not too severe, but where localized attack as a hazard such as in underground transformer tanks.

It has been demonstrated by service tests that in utilizing a composite having a stainless steel core sandwiched between two layers of carbon or low alloy steel, superior resistance to perforation was noted over a variety of bare and coated steels. For example, service corrosion tests on composite materials of this type were conducted by exposing test culverts in comparison with culverts of uncoated ingot iron, low alloy steels and other coated grades of steel. All of the culverts were buried in twenty-one installations representing seven classifications of corrosive environments normally encountered in culvert-service. Periodic inspection over an extended period showed the composite material still exhibited good resistance to perforation, while nearly all of the remaining test culverts were corroded and almost destroyed, or severely perforated.

SUMMARY OF THE INVENTION

Briefly, in the practice of this invention, a stainless steel plate whose thickness is at least about .5%, but preferably about 2–8%, of the total ingot, is secured vertically, in sandwich relationship between chill plates made of carbon steel, through the center or other desired position of a mold. Only simple preparation is required for the surfaces of this stainless and chill plates, such as pickling or shot blasting.

Into the two cavities formed by positioning the stainless-carbon steel composite in the mold, molten carbon or low alloy steel is poured. After the solidification of the molten steel, the composite ingot is stripped and processed by the conventional steps which may include: surface conditioning, heating, hot rolling, cold rolling, shearing, and coiling.

The foregoing procedure results in a composite structure which exhibits an excellent bond between the stainless steel and the carbon or low alloy steel. While the starting ratios between the two materials and the percent reduction thereafter will generally dictate the final thickness of the layers, for practical purposes, the stainless layer should be no less than .001 inch in the finished product. Preferably, it should be at least .005 inch thick to insure that the core is continuous in the final product, as well as providing a product which resist mechanical damage.

From the foregoing, it should be evident that the composite of this invention comprises essentially three layers, the outside layers being carbon or low alloy steel, and the inner layer, stainless steel. The ratio of the total thickness to the stainless core thickness of a final hot rolled product is about 10:1 to about 50:1. Lower ratios, on the order of 3:1, may be developed from the same starting product by further cold reductions. This phenomenon occurs since the stainless core is reduced less than the outer carbon or alloy steel layers.

DETAILED DESCRIPTION

It was indicated previously that this invention contemplates the provision of a metallic composite characterized by a thin, stainless steel core sandwiched between two relatively thick carbon or low alloy steel layers. Such composite is particularly valuable in moist environments where pitting-type corrosion is a primary problem.

At this juncture, it may be helpful to consider the phenomenon of corrosion and the manner, at least in theory, by which the present invention meets the problem. Generally considered the corrosion of metals is an electrochemical occurrence. That is, the flow of electric current is associated with the phenomenon. From this it would follow that excessive amounts of moisture, which is the vehicle for the current flow, tend to accelerate the action. From the above, it can be analogized that the phenomenon or corrosion is like that of a battery or electrolytic cell. In the respective systems, there is an anode and a cathode in a conducting solution, wherein said solution is called the electrolyte. Therefore, one of the major factors in the rate of corrosion is the magnitude of the current flow in the electrolyte. By directing said current flow, or in some way controlling it, the rate of corrosion can be minimized.

One of the foremost methods used by the prior art has been in the selection of an anodic or sacrificial coating on the metal to be protected. Hot dipped zinc coated steel is a prime example of the latter method. In this method, a steel core is provided with a layer of zinc by the continuous hot dip or galvanizing process. In service, the zinc acts like a barrier film to the steel core. Once the zinc layer is penetrated by the action of the corrosive environment, galvanic protection takes over. This galvanic protection just described is essentially the same as found with the present invention. However, in the former situation, once broad areas of the steel core become exposed general corrosion of the core takes place. In the latter, protection continues despite the exposure of the core.

Thus, as indicated above, the composite, as taught herein, contemplates a cathodic stainless steel core in a matrix of anodic carbon or low alloy steel. Since the stainless is cathodic to, or less anodic than the mild steel in corrosive environments, the corrosion of the mild steel protects the inner layer of stainless. However, when a corroded area or pit reaches the inner core of stainless steel, the pit enlarges rather than a penetration of the core. This was different than the combination of zinc on steel since the general corrosion rate of a plain carbon steel core is considerably higher than the rate of a stainless core.

A further development recognized in the composite of the invention is the synergistic relationship between the stainless steel core and the outer layers of carbon or low alloy steel under conditions of localized corrosion. That is, it has been found that under severe pitting conditions the performance of the composite was superior to that of equal thickness stainless. While there is no desire to be bound by any theory, it is believed that as the corrosion proceeds, the phenomenon of "polarization" takes place. Under this theory, it is believed that hydrogen is deposited on the surface of the cathodic stainless, thereby retarding the current flow which tends to lower the rate of corrosion. It will be acknowledged that this result is apparent only in cases of localized corrosion or "pitting" such as occurs under chloride attack. Under conditions of generalized corrosion, a stainless plate alone would offer better protection.

It should be apparent from the foregoing that an economical product has been developed which has excellent resistance to pitting type corrosion. This is accomplished by utilizing a composite having a stainless steel core in the ratio of about 1:3 to about 1:50 of the total thickness for the three-layer composite. The core should be at least .001 inch thick, but preferably .005 inch thick to insure core continuity.

Further attributes of this invention adding to its economical character are the material costs, and the method of producing, which method will now be described. Upon inspection of the product of this invention, several methods may appear plausible to those skilled in the art. None of them, however, approach the metallurgical soundness nor the economics realized herein.

The preferred procedure forms the composite at the ingot stage, an early step in producing steel. A stainless steel plate, whose thickness when compared with the mold falls within the range described above, is disposed along the axial center of, and parallel to, two sides of the mold. However, it should be understood that said stainless plate may be positioned off-center of the mold. In either case, to each major surface of said plate there is provided a protective layer of film. This layer is provided to inhibit alloy depletion of the stainless plate. In the preferred embodiment the protective layer will be in the form of mild steel or ingot iron chill plates placed adjacent the stainless core. This arrangement results in substantially two identical cavities in the preferred embodiment, on either side of the plate. Simultaneously into the top of each said cavity a quantity of molten carbon or low alloy steel is poured to fill the respective cavities. The simultaneous casting may be accomplished by means of a tundish having dual nozzles. This procedure requires a minimum of surface preparation for the stainless insert plate. Generally, a minor pickling or shotblasting step may be used. With other known methods, considerable surface preparation is required.

Depending on the ability of the protective layer to inhibit depletion, a dramatic change will be detectable on the composition variation from side-to-side. As an incident of this development, experiments were conducted on the effect of casting mild steel about stainless inserts without the use of a protective layer. As a result of the casting and solidification phenomenon taking place in the mold, a severe alloy depletion of the core occurred. While a central core area was discernible, it had a uniform but considerably lowered alloy analysis over that originally used. The chromium content was reduced by as much as 72%.

While not desiring to be bound by any theory regarding the severe core alloy depletion, it is believed that during the casting operation a skin of mild steel solidifies on the core plate. Since a stainless core (for example, AISI Type 304) has a melting point below that of the mild steel, there is sufficient heat to melt the stainless core. The solidified skin thickness and the alloy constituents of the stainless core begin to diffuse into the adjacent skin. It is believed that this lowers the melting point of a portion of the adjacent skin and that portion is remelted. Mixing ensues and a core of reduced alloy content forms. The new depleted core can be twice or more its initial volume when it finally stabilizes and solidifies. This procedure results in a composite structure, but one having a mild steel outer skin and a non-stainless core.

It was discovered by the present invention that with the addition of a protective layer, such as mild steel or ingot iron chill plates, it was possible to confine the core considerably such that only a minor alloy depletion resulted. For instance, in one series of examples where the chill plates varied between about 2.5 percent to .625 percent of the ingot thickness, the corresponding chromium depletion ranged from about .4% to about 29%. Even in the most severe case, the core was still considered stainless steel.

Continuing now with the processing of the solidified composite ingot, a standard rolling schedule was followed to reduce the ingot to a slab, then to a strip. While the processing subsequent to the casing of the ingot forms no part of this invention, such processing might include:

(1) Heating to about 2350° F.,
(2) Hot rolling to a slab thickness of about 7 inches,
(3) Surface conditioning such as by scarfing,
(4) Heating to about 2380° F.,
(5) Hot rolling to a strip thickness of about .180 inch,
(6) Pickling to remove scale, and
(7) Cold rolling to desired gage.

For the purpose of providing those skilled in the art with greater insight into this invention, an example is presented as illustrative of this invention.

Prior to casting the ingot, '5" thick mild steel plates were tack welded to the major surfaces of a Type 304 stainless slab which measured about 46" x 78" x 1.0". To assist in preventing the core plates from floating up during the casting operation, two 2.5" legs were welded onto the composite and attached to a base plate. The entire assembly was then placed on a mold stool and a 23" x 50" x 84" ingot mold was set in position. After centrally positioning the composite, exothermic side boards were placed in side the top of the mold to control the shrinkage in accordance with standard steel making practice. Aluminum killed molten steel, whose chemistry was as follows:

| | Percent |
|---|---|
| Carbon | .034 |
| Manganese | .31 |
| Sulfur | .023 |
| Phosphorus | .003 |
| Copper | .11 |
| Tin | .003 |
| Iron | Balance |

was cast on each side of said composite by means of a double nozzle tundish. The pouring time was about 3½ minutes from opening to closing the ladle stopper rod. The stripped ingot was processed as described above into coil form having a thickness of about .180 inch. Typical Mechanical Properties are listed in Table I.

TABLE I.—TYPICAL MECHANICAL PROPERTIES

| Direction | Yield strength, p.s.i. | Tensile strength, p.s.i. | Percent elongation in 2" | Hardness $R_B$ |
|---|---|---|---|---|
| Longitudinal | 37,700 | 56,500 | 36 | 54 |
| Transverse | 37,000 | 56,600 | 24 | 54 |

These properties are substantially the same as aluminum killed steel, having the composition given above without the stainless core, and processed by the same sequence of operations.

It will be understood by those skilled in the art that while the preceding discussion covered the use of Type 304 stainless, other types of stainless steel are contemplated. Generally, the proposed application and the severity of the environmental conditions will dictate the type of stainless needed in the composite. or example, where chloride environments are contemplated, a molybdenum bearing austenitic stainless steel may be desired. On the other hand, a Type 410 stainless steel will be adequate under less severe conditions. Therefore, stainless steel as contemplated herein includes all ferrous alloys containing about 11% or more chromium, and other alloying elements normally found therein.

A further and final feature contemplated by this invention is the provision of an exterior coating on the finished clad product. It may be desirable to secure additional general corrosion protection or merely to enhance the appearance of the product. Accordingly, the coating may be metallic such as zinc, aluminum, terne, lead, chromium, nickel, cadimum, etc., or a non-metallic such as asphalt, paint, plastics, etc. However, this listing is merely illustrative and should not be read as excluding others. No attempt will be made here to suggest a coating or combination of coatings for a given environment as it is believed that a skilled worker in the art will known the most appropriate coating to be used, and the manner of applying same.

In view of the variations which may become apparent to those skilled in the art, no limitation is intended to be imposed herein except as set forth in the appended claims.

The embodiments of the invention in which an exclusive property or privilege is claimed are defined as follows:

1. The method of producing a metallic *clad product* [composite ingot] having a thin core of stainless steel fused to, *and sandwiched between,* two thick outer layers of carbon or low alloy steel, comprising the steps of selecting a plate of stainless steel, applying to the major surfaces thereof a metallic protective layer suitable to control the depletion of chromium therefrom to a level no less than about 11%, and casting a corbon or low alloy steel *about the outside surfaces* [to the outside] of said protected stainless steel plate to form *a composite clad product* [an ingot].

2. The method according to claim 1 wherein said protective layer comprises a pair of mild steel or ingot iron plates disposed adjacent said stainless steel plate.

3. The method according to claim 1 wherein the thickness of said stainless plate is at least .5% of the *composite clad product* [ingot] thickness.

4. The method according to claim 3 wherein the thickness of said stainless plate is from 2–8% of the [ingot] *composite clad product* thickness.

5. The method according to claim 1 including a reduction step which comprises reducing said [ingot] *composite clad product* to produce a strip whereby the thickness of the resulting stainless core is at least .001 inch.

6. The method according to claim 5 wherein said reducing step comprises hot reduction to produce a strip whereby the ratio of the strip thickness to the core thickness is between about 10:1 to 50:1.

[7. The method according to claim 6 wherein said reducing step includes a final cold reduction and the ratio of the strip thickness to the core thickness is at least 3:1.]

8. The method according to claim 6 wherein said core thickness is at least .005 inch.

*9. The method of producing a metallic composite clad product having a thin core of stainless steel fusion bonded to, and sandwiched between, two thick outer layers of carbon or low alloy steel, comprising the steps of selecting a plate of stainless steel, applying to the major surfaces thereof a metallic protective layer of a thickness at least about .625% of the total ingot thickness, to confine the core considerably, and suitable to control the depletion and dissolution of chromium therefrom to a level no less than about 11%, and casting a carbon or low alloy steel about the outside surfaces or said protected stainless steel plate to form a composite clad product.*

*10. The method according to claim 9 wherein said protective layer comprises a pair of mild steel or ingot iron plates disposed adjacent said stainless steel plate.*

*11. The method according to claim 9 wherein the thickness of said stainless plate is at least .5% of the composite clad product thickness.*

*12. The method according to claim 11 wherein the thickness of said stainless plate is from 2–8% of the composite clad product thickness.*

*13. The method according to claim 9 including a reduction step which comprises reducing said composite clad product to produce a strip whereby the thickness of the resulting stainless core is at least .001 inch.*

*14. The method according to claim 13 wherein said reducing step comprises hot reduction to produce a strip whereby the ratio of the strip thickness to the core thickness is between about 10:1 to 50:1.*

*15. The method of producing a metallic strip having a stainless steel core of a thickness of at least .001 inch, fusion bonded between thicker outer layers of carbon or low alloy steel, comprising the steps of producing a metallic composite clad product by the method of claim 9, and hot rolling said clad product down to final strip thickness, such that the ratio of strip thickness to core thickness is between about 10:1 and 50:1, and the core is continuous in the final product.*

*16. The method of producing a metallic strip having a stainless steel core of a thickness of at least .001 inch, fusion bonded between thicker outer layers of carbon or low alloy steel, comprising the steps of producing a metal-*

*lic composite clad product by the method of claim 9, hot rolling said claid product to produce a strip wherein the ratio of strip thickness to the core thickness is between about 10:1 and 50:1, and thereafter cold rolling said strip to final strip thickness wherein the core is continuous in the final product.*

*17. The method of claim 16 wherein said core thickness is at least .005 inch.*

References Cited

The following references, cited by the Examiner, are of record in the patented file of this patent or the original patent.

UNITED STATES PATENTS

| | | | |
|---|---|---|---|
| 1,950,871 | 3/1934 | Trembour | 29—470.9 |
| 300,730 | 6/1884 | Pedder | 29—527.7 X |

| | | | |
|---|---|---|---|
| 2,890,915 | 6/1959 | Benham | 164—98 X |
| 3,412,782 | 11/1968 | Fromson | 164—95 X |
| 3,461,944 | 8/1969 | Kuebrich | 164—100 |
| 1,355,255 | 10/1920 | Payne | 29—Dig. 8 |
| 3,540,117 | 11/1970 | Kennedy et al. | 29—527.7 |

FOREIGN PATENTS

| | | | |
|---|---|---|---|
| 388,535 | 3/1933 | Great Britain | 29—470.9 |
| 407,362 | 3/1934 | Great Britain | 29—Dig. 8 |

CHARLES W. LANHAM, Primary Examiner

D. C. REILEY III, Assistant Examiner

U.S. Cl. X.R.

29—470.9; 164—76, 100